United States Patent [19]

Rahnema

[11] Patent Number: 5,596,722
[45] Date of Patent: Jan. 21, 1997

[54] PACKET ROUTING SYSTEM AND METHOD FOR ACHIEVING UNIFORM LINK USAGE AND MINIMIZING LINK LOAD

[75] Inventor: Moe Rahnema, Chandler, Ariz.

[73] Assignee: Motorola, Inc., Schaumburg, Ill.

[21] Appl. No.: 415,948

[22] Filed: Apr. 3, 1995

[51] Int. Cl.$^6$ ........................................ H04J 3/24
[52] U.S. Cl. ........................ 395/200.15; 370/400
[58] Field of Search ......................... 395/200.15, 200.14, 395/200.13, 200.12, 200.11, 200.1–9; 370/94.1–94.3, 16–17, 54, 60–60.1

[56] References Cited

U.S. PATENT DOCUMENTS

| | | | |
|---|---|---|---|
| 4,466,660 | 8/1984 | Riddle | 395/200.15 |
| 4,736,363 | 4/1988 | Aubin et al. | 370/60 |
| 4,905,233 | 2/1990 | Cain et al. | 370/94.1 |
| 4,956,841 | 9/1990 | Judeinstein et al. | 370/94.1 |
| 5,018,133 | 5/1991 | Tsukakoshi et al. | 370/16 |
| 5,031,093 | 7/1991 | Hasegawa | 395/200.02 |
| 5,088,032 | 2/1992 | Bosack | 395/200 |
| 5,088,090 | 2/1992 | Yacoby | 370/85.13 |
| 5,095,480 | 3/1992 | Fenner | 370/94.1 |
| 5,115,495 | 5/1992 | Tsuchiya et al. | 395/200.15 |
| 5,150,464 | 9/1992 | Sidhu et al. | 395/200.1 |
| 5,175,733 | 12/1992 | Nugent | 370/94.3 |
| 5,179,556 | 1/1993 | Turner | 370/94.1 |
| 5,179,558 | 1/1993 | Thacker et al. | 370/94.3 |
| 5,214,646 | 5/1993 | Yacoby | 370/85.14 |
| 5,218,676 | 6/1993 | Ben-Ayod et al. | 395/200.15 |
| 5,227,802 | 7/1993 | Pullman et al. | 342/352 |
| 5,243,592 | 9/1993 | Perlman et al. | 370/17 |
| 5,253,161 | 10/1993 | Nemirovsky et al. | 364/402 |
| 5,253,248 | 10/1993 | Dravida et al. | 370/16 |
| 5,274,642 | 12/1993 | Widjaja et al. | 370/94.1 |
| 5,282,270 | 1/1994 | Oppenheimer et al. | 395/200.11 |
| 5,289,462 | 2/1994 | Ahmadi et al. | 370/60.1 |
| 5,317,566 | 5/1994 | Joshi | 370/60 |
| 5,359,593 | 10/1994 | Derby et al. | 370/17 |
| 5,426,674 | 6/1995 | Nemirovsky et al. | 395/200.1 |

OTHER PUBLICATIONS

"Principles of Communication Systems", Second Edition, by Herbert Taub and Donald L. Schilling, McGraw–Hill Book Company, pp. 514–515.

*Primary Examiner*—Christopher B. Shin
*Attorney, Agent, or Firm*—Gregory J. Gorrie

[57] ABSTRACT

Data packets are routed among nodes of a communication system in a uniform fashion. Substantial uniform link usage is achieved within allowed routes determined by end to end transport delay criteria. Initial routes are selected for each source—destination pair from alternative minimal hop routes. Link usage probabilities are calculated for the links involved in each route and system network routing entropy is calculated from the link usage probabilities. Final routes are chosen to maximize the network routing entropy resulting in uniform usage of the system's communication links in proportion to link capacity. The aggregate link load is also minimized. Individual routing tables are generated for each communication node based on the selected routes. The routing tables reflect changes in the traffic demand, changes in link capacity and changes in node connectivity within the constellation which occur as a result of satellite motion.

14 Claims, 4 Drawing Sheets

ROUTING TABLE

PACKET ROUTING SYSTEM AND METHOD FOR ACHIEVING UNIFORM LINK USAGE AND MINIMIZING LINK LOAD

CROSS-REFERENCE TO RELATED APPLICATIONS

This application is related to co-pending U.S. patent application Ser. No. 08/222,067, filed on Apr. 04, 1994, entitled "METHOD AND APPARATUS FOR ADAPTIVE DIRECTED ROUTE RANDOMIZATION AND DISTRIBUTION IN A RICHLY CONNECTED COMMUNICATION NETWORK" which is assigned to the same assignee as the present application.

TECHNICAL FIELD OF THE INVENTION

The present invention relates generally to communication systems. More specifically, the present invention relates to systems that route data packets between nodes of a communication system.

BACKGROUND OF THE INVENTION

Communication networks, such as those used to deliver telecommunications, to interconnect computers, and the like, may include any number of nodes. The networks may deliver electronic communications between two points by routing the communications from node to node within the network. As the number of nodes in a network increases and as the number of communication paths available to each network node increases, the number of potential paths available for delivering any single communication likewise increases. Accordingly, the problem of selecting an appropriate path through the network arises. Typically, a network attempts to select the shortest possible path to minimize delay, to consume a minimal amount of network resources, and to maximize reliability in delivering a communication. At the same time, a network needs to balance this concern with a need to prevent communication traffic bottlenecks and a need to achieve the highest possible probability that a communication will be delivered to its intended destination. Routing becomes increasing more difficult when the position of the nodes is changing and where the data handling capacity of the links varies.

Thus, what is needed are a routing method and apparatus which achieves uniform network link usage while limiting number of hops on each path. What is also needed are a method and apparatus that achieves uniform link usage while minimizes the aggregate link traffic load as much as possible. What is also needed are a method and apparatus for routing packets among nodes in a communication system coupled by links that have different data handling capacities. What is also needed are a method and apparatus for routing data packets that achieves uniformity in the usage of network links considering the capacities of the links.

What is needed are a method and apparatus of routing data packets among nodes in a communication system where the nodes are moving with respect to each other, and where the connections or links between the nodes are changing as a function of the position of the node. What is also needed are a routing apparatus and method that computes routes in advance for use by the nodes in real-time. What is also needed are a method and apparatus for routing that minimizes packet transport delays or keeps packet transport delays below an acceptable limit.

DETAILED DESCRIPTION OF THE DRAWINGS

As described herein, the present invention provides among other things, a method and apparatus for routing data packets in a communication system. The present invention achieves substantially uniform link usage based on traffic forecast data. Substantial uniform link usage is achieved while minimizing the aggregate link traffic load. The present invention also provides substantial uniform link usage in proportion to the data capacity of each of the links.

A "satellite" is defined herein to mean a man-made object or vehicle intended to orbit earth. A "constellation" is defined herein to mean an ensemble of satellites arranged in orbits for providing specified radio communication coverage of portion(s) or all of earth. The term "satellite" is intended to include both geostationary and orbiting satellites and/or combinations thereof including low earth orbiting (LEO) satellites.

Figure 1:
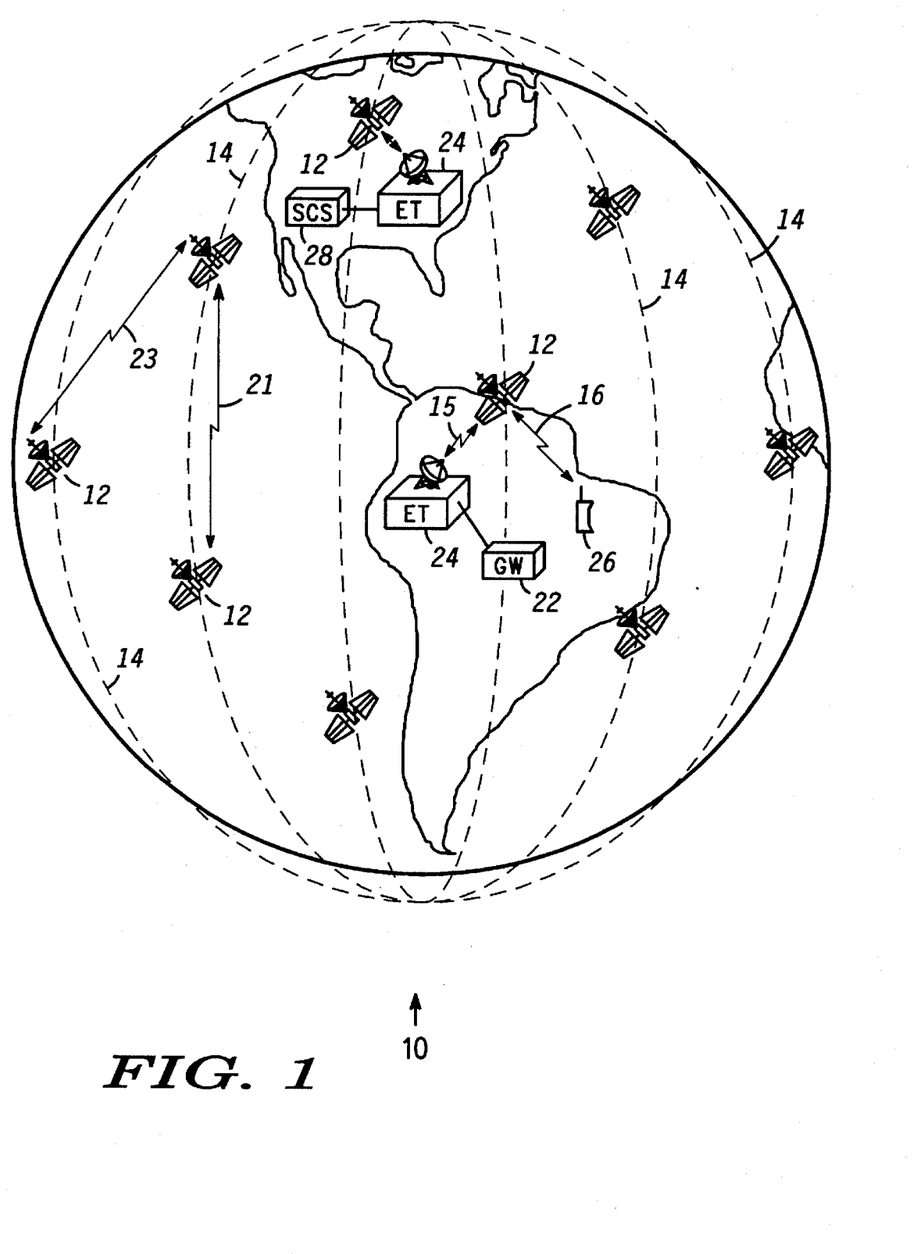
FIG. 1 illustrates a highly simplified diagram of a satellite based communication system of which the present invention may form a portion.

FIG. 1 illustrates a highly simplified diagram of satellite based communication system 10 of which the present invention may form a portion. Communication system 10 is shown dispersed over and surrounding earth through use of orbiting satellites 12 occupying orbits 14. Communication system 10 uses six polar orbits 14, with each orbit 14 holding eleven satellites 12 for a total of sixty-six satellites 12. However, this is not essential and more or fewer satellites, or more or fewer orbits, may be used.

For example, each orbit 14 encircles Earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of Earth at any instant.

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

Communication system 10 may accommodate any number, potentially in the millions, of subscriber units 26. In the preferred embodiments of the present invention, subscriber units 26 communicate with nearby satellites 12 via subscriber links 16.

Satellites 12 communicate with other nearby satellites 12 through in-plane cross-links 21 and cross-plane cross-links 23. Links 21 and 23 are preferably combinations of K-Band frequency channels and may encompass Frequency Division Multiplex Access (FDMA) and/or Time Division Multiple Access (TDMA) communications. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geopolitical boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

Data packets are used to transport a communication to or from subscriber unit 26. The data packets include a routing code that indicates includes a source or originating node indicator along with a destination node indicator. The source and destination node indicators and are used by satellite nodes 12 (FIG. 1) to route a packet to its destination. At the destination satellite, the packet is transmitted on a downlink (i.e., subscriber unit link 16) to either a subscriber unit 26, or to a gateway 22.

Figure 2:
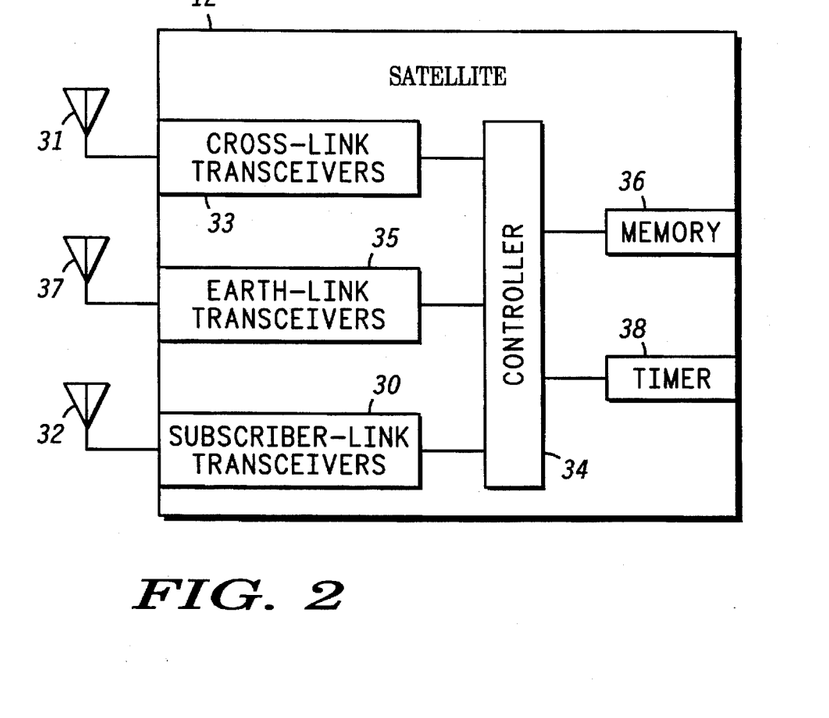
FIG. 2 illustrates a simplified block diagram of a satellite communication node suitable for use in a preferred embodiment of the present invention.

FIG. 2 illustrates a simplified block diagram of satellite communication node 12 suitable for use in a preferred embodiment of the present invention. Satellite node 12 is provided by a satellite 12. Preferably, all satellites 12 within communication system 10 (see FIG. 1) include equipment as illustrated by the block diagram of FIG. 3. Satellite 12 includes cross-link transceivers 33 and associated antennas. Transceivers 33 and antennas 31 support cross-links 21 and 23 (FIG. 1) to other nearby satellites 12. Earth-link transceivers 35 and associated antennas 37 support earth-links to communicate with earth terminals 24 (FIG. 1). Moreover, subscriber link transceivers 30 and associated antennas 32 support subscriber units 26 (FIG. 1). Preferably, each satellite 12 may simultaneously support a link for up to several thousand or more of subscriber units 26 (FIG. 1).

A controller 34 couples to each of transceivers 33, 35, and 30 as well as to a memory 36 and a timer 38. Controller 34 may be implemented using one or more processors. Controller 34 uses timer 38 to maintain, among other things, the current date and time. Memory 36 stores data that serve as instructions to controller 34 and that, when executed by controller 34, cause satellite 12 to carry out procedures which are discussed below. In addition, memory 36 includes variables, tables, and databases that are manipulated due to the operation of satellite 12. Memory 36 preferably includes routing tables used for routing data packets.

Figure 3:
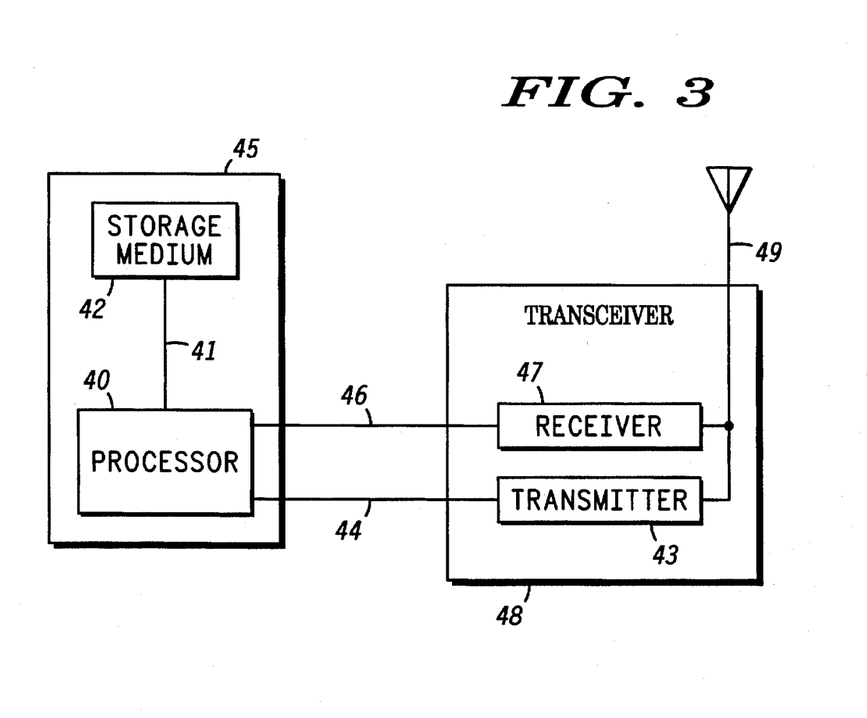
FIG. 3 illustrates a simplified block diagram of a portion of a system control station and an earth terminal suitable for use in a preferred embodiment of the present invention.

FIG. 3 illustrates a simplified block diagram of a portion of control station 45 and earth terminal 48 suitable for use in a preferred embodiment of the present invention. Control station 45 and earth terminal 48 are desirably part of SCS 28 (FIG. 1) and ET 24 (FIG. 1) respectively. Control station 45 comprises processor(s) 40 coupled to associated storage medium 42 (e.g., random access memory or RAM, other semiconductor or magnetic read-write memory devices, optical disk, magnetic tape, floppy disk, hard disk etc.) via link 41. Earth terminal 48 includes antenna 49 coupled to transmitter 43 and receiver 47. Transmitter 43 and receiver 47 are coupled to processor 40 via links 44 and 46, respectively. Processor 40 desirably carries out procedures exemplified below and described in associated text. For example, in addition to performing other tasks as appropriate, processor 40 desirably stores results from such procedures in storage medium 42. Transmitter 43 and/or receiver 47 transmit messages to and/or receive messages from satellites 12.

In a preferred embodiment of the present invention, communication system 10 (FIG. 1) includes sixty-six LEO satellites arranged in six orbits each containing eleven satellites 12. In reference to FIG. 1, each satellite 12 is coupled to two other satellites 12 within the same orbit 14 or orbital plane by in-plane cross-links 21. The capacities of in-plane cross-links 21 remain constant. Link capacity includes data carrying capacity. In a preferred embodiment, the cross-link capacity ranges from 100 to 200 packets for each frame time and is preferably about 140 packets per 9 milliseconds frame time. The capacities of cross-plane cross-links 23 (e.g., left and right cross-links) on the other hand vary from a maximum value when the satellites are furthest apart to a minimum value as cross-plane links 23 are shut down. For example, referring to FIG. 1, satellites 12 in different orbits 14 are furthest apart when near the equator, and are closest together near the poles. In a preferred embodiment, cross-plane cross-links 23 are shut down as part of a cell management process.

As each satellite 12 moves through its orbits, cross-plane cross-links 23 between two satellites in neighboring orbits varies in capacity from a maximum at equator to zero when the link are turned off. Cross-link shut down occurs at an angle of around sixty-eight degrees from the equator. The cross-plane links are preferably turned off to maintain TDMA synchronization, among other things. Cross-plane links 23 remain off until the associated satellite crosses a pole and are turned back on when the cross-link picks up capacity. The same cycle occurs as a satellite approaches the other pole. Moreover, as two cross-plane connected satellites travel over a pole, they switch sides in the sense of the left and right neighboring node connections. A time variation in the relative node connectivity and topology occurs as the constellation rotates. Because of this, routing information stored within the nodes (i.e., for reaching other nodes from that node) should be updated regularly and predictably. Regularly recurring time variations of satellite node connectivity within the constellation is desirably quantized into a number of distinct topology states for the constellation. The periodic motion and position of the various satellites within the constellation is desirably known and stored in the system.

Figure 4:
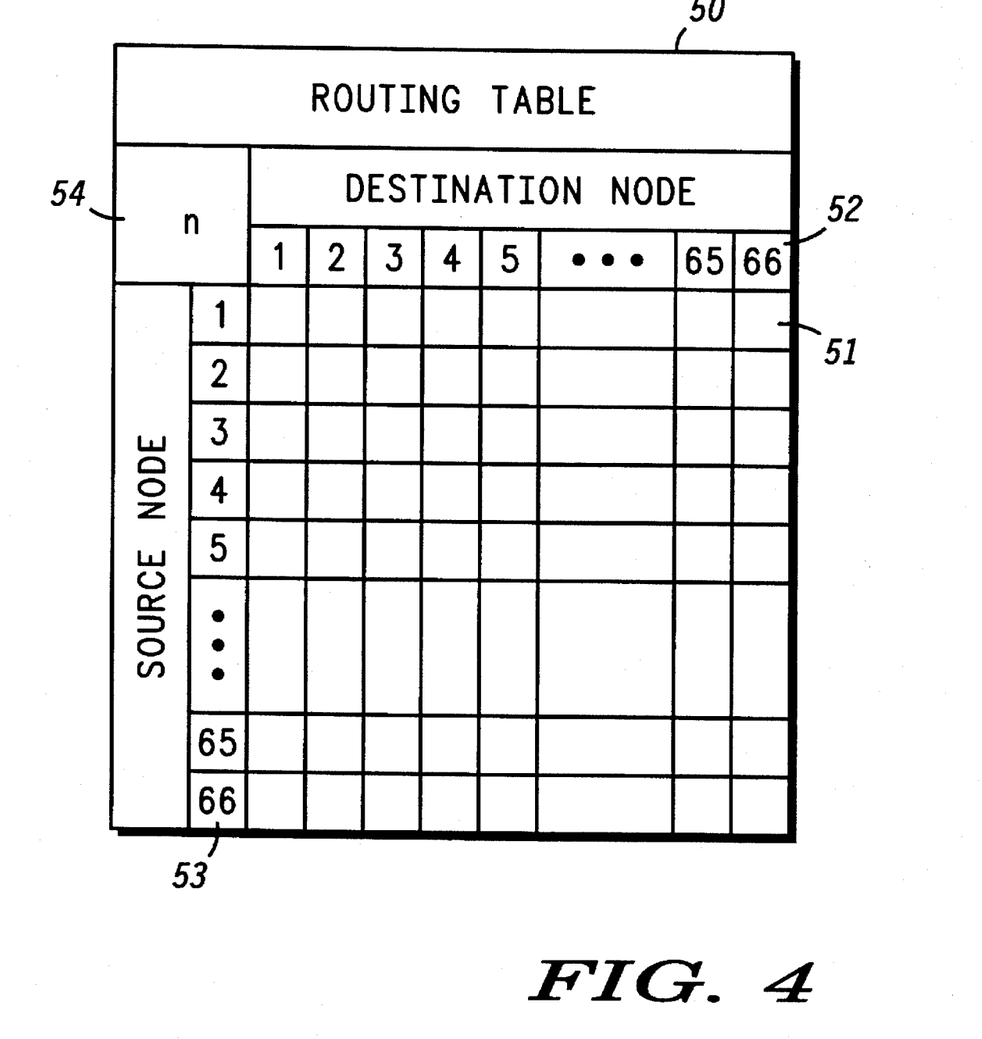
FIG. 4 illustrates an example of a routing table data structure suitable for use in a preferred embodiment of the present invention.

FIG. 4 illustrates an example of a routing table data structure suitable for use in a preferred embodiment of the present invention. The routing information used by a packet entering a satellite node to determine the cross-link to exit will be organized as a look-up table using the packer's destination. In a preferred embodiment, the look-up table may be stored in RAM based memory including a seven-bit address to the table for the packet's destination. Each communication node 12 of system 10 preferably contains at least one routing table 50. In the preferred embodiment, each communication node contains one of routing tables 50 for each predetermined time interval discussed below.

The intersection of a row and column of routing table 50 is filled with routing instructions 51 that direct a data packet to an exit link based on a destination of the data packet. Routing table 50 illustrates one set of routing instructions for each possible route between any two communication nodes. Data packets are routed from a source node to a destination node. In this embodiment, a route is defined for each source—destination node combination. Routing table 50 illustrates source nodes 53 and destination nodes 52.

The routing instruction 51 contained in the table entries are desirably a designator for one of several possible exit links from the communication node. For example, in one embodiment, routing instruction 51 include an "F" which designates an in-plane cross-link 21 which is forward (i.e., in the direction of flight of the satellite) or alternatively contain an "A" which designates the in-plane cross-link 21 which is to the aft or rear (i.e., opposite the direction of flight of the satellite). Routing instruction 51 alternatively contain an "R" which designates a cross-plane cross-link 23 which to the right, or an "L" which designates a cross-plane cross-link 23 which to the left (as viewed facing in the direction of flight). Routing instruction 51 contains many other exit link designators when a communication node has many possible exit links. The exact number of exit links and exit link designators is not important for the present invention. Routing instruction 51 alternatively contains a gateway designator which designates one of several gateway antenna subsystems that connect the satellite with the terrestrial facilities (e.g., ET 24, FIG. 1) using earth link 15 (FIG. 1).

In a preferred embodiment of the present invention, several routing tables 50 are used to route data packets. Each routing table 50 has a table number designator 54. Each of the several routing tables desirably specify different routing instruction sets. These different tables are selected, for example, based on the particular time interval and constellation configuration for which the routing table was generated.

Figure 5:
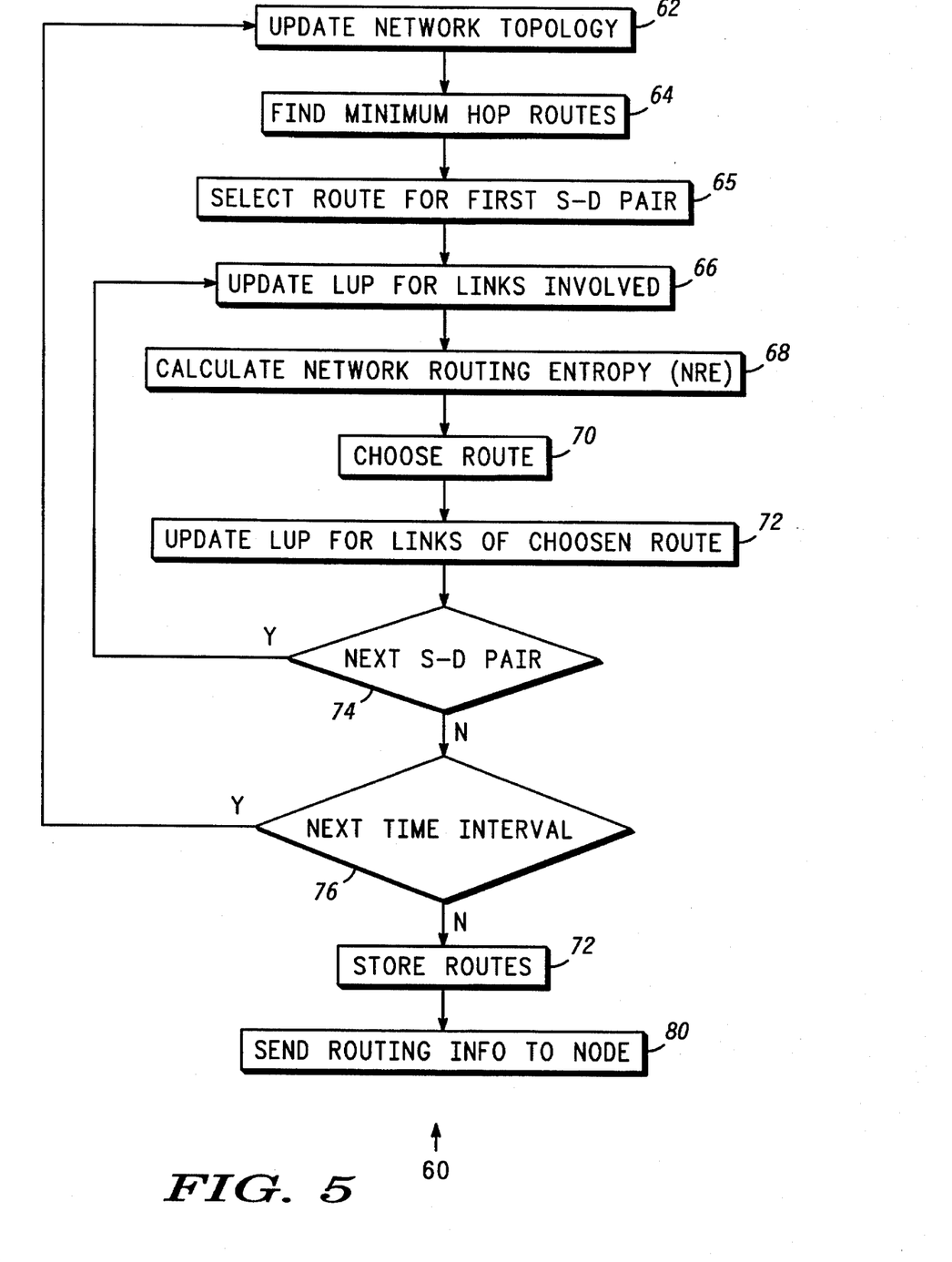
FIG. 5 shows a procedure for determining routing of data packets within the constellation suitable for use in a preferred embodiment of the present invention.

FIG. 5 shows procedure 60 for determining routing of data packets within the constellation suitable for use in a preferred embodiment of the present invention. Procedure 60 is desirably performed on a regular basis, and in a preferred embodiment, is performed whenever a link fails or is turned off. In one preferred embodiment, procedure 60 may be performed only once. Procedure 60 pre-computes routing information for combinations of source—destination node pairs, preferably for each predetermined time interval or period during a 24-hour period. In the preferred embodiment, each predetermined time interval ranges from 15 seconds to several minutes. Each predetermined time period has an associated traffic forecast which indicated the traffic demand between any source and destination node in the system. In addition, procedure 60 pre-computes routing information for each constellation configuration that results from the different orbital positions of the satellite nodes. Different constellation configurations may also result from link and node failures.

In the preferred embodiment, procedure 60 is performed by processor 40 (FIG. 3) however nothing requires this. Portions of procedure 60 may be performed by a separate computer as part of a computer program.

Task 62 of procedure 60 updates the network topology. Failed links and links shut down during the next predetermined time interval are removed from consideration for routing. The links may have been shut off by a cell management process which shuts off satellite links and cells due to antenna pattern overlap as the satellites approach the poles.

Task 64 finds routes for source—destination pairs in the system. Preferably, task 64 finds minimum hop routes, or routes having a hop count below a certain acceptable threshold. In addition, task 64 may find all possible routes between each source—destination pair in the system. Any node can be a source for a data packet and any node can be a destination for the data packet. A source—destination pair includes the source and the destination satellite node. In the preferred embodiment of sixty-six satellite nodes, there are 4290 (66×65) possible source—destination pairs. However, since it may be desirable for a data packet to be routed over a different path when traveling in the reverse direction between a source and destination node, there are 4356 (66×66) possible directional source—destination pairs. A minimum hop route is found by determining the route with the minimum number of links between the source and destination nodes. There may be several minimum hop routes with the same number of links and satellite nodes to "hop", all of which are preferably found by task 64. In the case where there is only one minimum hop route, alternate hop routes may be found having a hop length below an acceptable threshold. For example, an acceptable threshold may be based on the amount of delay acceptable for satisfactory communications for a particular type of data packet (i.e., voice or data).

Task 65 selects one route found in task 64 for the first source—destination pair. The one route selected is preferably a minimum hop route, but may be arbitrarily chosen when there are several routes having similar hop counts. Desirably, the remaining routes are recorded as alternative choice routes.

Task 66 calculates a link usage probability (LUP) for the first source—destination (S-D) pair and the selected minimum hop route found in task 65. Each time a route is considered, the LUP for all links involved in that route are updated. In one preferred embodiment, task 66 may compute or update a LUP for each link of a selected minimum hop route. The LUP for link "i" is preferably calculated from the following expression:

$$LUP_i = F_j/(T_j * C_i)$$

The term "$F_i$" represents the accumulated usage of link "i" up to this point in procedure 60. Preferably, $F_i$ is calculated by the following expression:

$$F_i = \sum_{k=1}^{j} D_i^k$$

The term "D" represents traffic demand such that $D_i^k$ represents the fraction of the network traffic demand projected for source—destination pair k over the time interval under consideration at this point in procedure 60 whose decided route is crossing link "i". The term "j" is the source—destination pair being considered at this point in procedure 60. For each source—destination pair "k", $D_i^k$ represents the percent of traffic projected for that source—destination pair "k" whose route has crossed link "i". $D_i^k$ is preferably in terms of bits per second or packets per second.

The term "$C_i$" represents a measure of traffic carrying capacity of link "i". For example, may represent either a maximum amount of traffic that link "i" can handle during the particular time interval under consideration in procedure 60. $C_i$ is preferably in bits or packets per second but may also be in the number of traffics. If the link capacities of all the links are equal, $C_i$ may be set to one.

The term "$T_j$" represents the aggregate traffic load on all links involved in routing up to this point in procedure 60. For example, $T_j$ is preferably calculated as follows:

$$T_j = \sum_{i=1}^{m} F_i$$

The term "m" represents the total number of links involved in routing up to this point in the procedure. The term "j" is the source—destination pair being considered at this point in procedure 60. In determining routing, the source—destination pair number "j" is incremented for each source—destination pair of nodes. The LUP for each link involved in the selected route is updated. Once the LUPs for each link are calculated for the selected routes, task 68 calculates a normalized network routing entropy (NRE) for the entire system. The NRE is preferably calculated by the following expression where $T_j$ is the normalization factor:

$$NRE = -\frac{1}{T_j} \sum_{i} (LUP_i \log LUP_i)$$

The NRE is minus the sum of the product of LUP and the Log of the LUP for each link in the constellation. Task 68 also updates the NRE each time task 68 is executed (i.e., for each source—destination pair considered). "i" indexes over all links involved in at least one of the routes specified for usage. This expression for NRE without the normalization factor $T_j$ is conceptually similar to a definition of entropy used in information theory, in which case the LUPs represent probabilities associated with different events such as bit errors.

Task 70 chooses a minimum hop route from the minimum hop routes found in task 64 for the source—destination pair under consideration which results in the largest NRE for the network as a primary choice route. Minimum hop routes resulting in the next largest NRE are selected as alternative or secondary routes in the routing tables. The maximization of entropy in information theory results when all the events are equally likely. In the present invention, the routes chosen which create the largest NRE result in the most uniform link usage of all links in the network. The maximization of NRE weighed by the inverse of the traffic load on the network links (i.e., $1/T_j$) uniformizes the traffic loading on various links of the network while at the same time minimizes the aggregate link traffic load. In other words, traffic is diluted over the network links while uniformly distributed over the links to the extent possible. One reason for this is that the calculation of $T_j$ takes its maximum at the point where it has the largest numerator. This occurs when all LUPs take the same, or close to the same value, which is when there is uniform traffic on all links. The expression for $T_j$ takes its minimum value for the denominator when the aggregate traffic load on the network links is smallest which is a dilution effect.

Task 72 updates the LUP for each link of the route chosen as a first choice route in task 70. The route(s) not selected are preferably listed as alternative minimum hop routes, in the order of their LUP or resulting NRE.

Task 74 determines if all S-D pairs in the constellation of nodes have been considered, and if not, proceeds back to task 66 to consider the next S-D pair combination (i.e., j is incremented by one). Tasks 66–72 are repeated for all other source—destination pairs. When all S-D pairs are considered, minimum hop routes have been selected for each S-D pair. Task 76 determines if all known constellation configurations and time intervals have been considered. For example, projected traffic demand may be different for each time interval.

When all constellation configurations and time intervals have been considered, task 78 stores the route information. The stored information includes a list of selected routes for each S-D pair for each constellation configuration during predetermined periods of time. Preferably, task 78 stores the route information in routing tables similar to routing table 50 (FIG. 5), where each routing table is for a particular time interval. Task 80 sends routing information to each node. Preferably, task 80 is performed by SCS 28 through ET 24.

Procedure 60 may be performed whenever network topology changes, or whenever new traffic information is available and is it desirable to change the routing.

As described herein, the advantages of the present invention will be apparent to those of skill in the art and provides an improved method and apparatus of routing data packets among nodes in a communication system where the nodes are moving with respect to each other, and where the connections or links between the nodes are changing as a function of the position of the node, and due to link failures. These advantages include a routing method that computes routes in advance using the expected traffic projections obtained from past history for use by the nodes in real-time. Another advantage of the routing method is that uniformity of usage of network links is achieved while limiting number on hops on each path used for routing. Another advantage of the present invention is that the routing method achieves uniformity which helps prevent link congestion. Another advantage is that packet transport delays are minimized or kept below an acceptable limit. Another advantage is that substantial uniformity in the usage of network links in proportion to the data capacity of the links is achieved. Another advantage is that the routing method actually prevents congestion, rather than reacts to it.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. In a communication system comprising a plurality of nodes that communicate with each other over links wherein each of said links has a link capacity associated therewith, a method of routing data packets among said plurality of nodes comprising the steps of:

(a) finding routes between a source node and a destination node, each of said routes comprising a sequence of links over which to send a data packet;

(b) calculating a link usage probability (LUP) for each link associated with each of said routes, said LUP being proportional to a number of times an associated link is included on one of said routes and inversely proportional to said link capacity of said associated link;

(c) calculating a normalized network routing entropy (NRE) for each of said routes using said LUPs associated with each link of said routes, said normalized NRE being normalized by an aggregate traffic load on all of said links;

(d) selecting a final route from said routes, said final route having a largest of said normalized NREs; and (e) routing said data packet from said source node to said destination node over said final route.

2. A method as claimed in claim 1 further comprising the steps of:

initially updating said LUP by increasing said LUP proportionally to a number of times said associated link is part of one of said routes; and finally updating said LUP for each link associated with said final route by increasing said LUP proportionally to said number of times each link is included on said final route.

3. A method as claimed in claim 1 further comprising the step of determining, for each of said routes, a link having a maximum value of said LUPs, and wherein the selecting step includes the step of choosing said final route having said link with a lowest of said maximum value of said LUPs.

4. A method as claimed in claim 1 wherein said final route includes said sequence of link and transit nodes, and wherein the method further comprises the step of storing said final route in said source node, said destination node, and each of said transit nodes.

5. A method as claimed in claim 1 further comprising the step of determining available links that will be usable during a predetermined time period, and said finding step further comprises the step of considering only said available links for finding said routes.

6. A method as claimed in claim 1 further comprising the step of repeating steps (a) through (d) for each source—destination node combinations of said plurality of nodes.

7. A method as claimed in claim 1 further comprising the step of providing traffic data for each of a plurality of predetermined time periods, and wherein step (c) includes the step of calculating said LUPs based on said traffic data for said predetermined time period.

8. A method as claimed in claim 7 further comprising the step of repeating steps (a) through (d) for each of said plurality of predetermined time periods.

9. A method as claimed in claim 1 wherein:

step (a) comprises the step of finding minimum hop routes between said source node and said destination node, wherein each of said minimum hop routes comprising a sequence of links over which to send a data packet;

step (b) includes the step of calculating said link usage probability (LUP) for each link associated with each of said minimum hop routes;

step (c) includes the step of calculating said normalized network routing entropy (NRE) for each of said minimum hop routes using said LUPs associated with each link of said minimum hop routes; and step (d) includes the step of selecting said final route from said minimum hop routes, said final route having a largest of said NREs.

10. A method as claimed in claim 9 wherein the finding step comprises the step of finding alternative minimum hop routes when the finding step finds only one of said minimum hop routes, said alternative minimum hop routes including routes having less than a predetermined number of hops, said predetermined number being greater than a number of hops of said one of said minimum hop routes.

11. In a communication system comprised of a plurality of nodes that communicate over links, a method of routing data packets among said nodes comprising the steps of:

(a) determining available links during each of a plurality of predetermined time periods, each predetermined time period having an associated traffic forecast;

(b) finding, for each of said predetermined time periods, routes between source and destination node pairs, each of said routes comprising a sequence of said available links over which to send a data packet;

(c) calculating a link usage probability (LUP) for each of said links of said sequences, said LUP based on a number of times a link is used in each of said sequences;

(d) calculating a normalized network routing entropy (NRE) for each of said routes based on said LUP of each link of said routes;

(e) selecting, for each of said source and destination node pairs, one of said routes for each of said predetermined time periods, said one route resulting in a largest normalized NRE; and (f) routing, during said predetermined time periods, said data packet between a source node and a destination node of one of said source and destination node pairs over the route selected in step (e).

12. A method as claimed in claim 11 wherein each of said links has a link capacity, and wherein step (c) further comprises the step of calculating said LUP for each link selected in step (e) and dividing by said link capacity, and wherein step (d) further comprises the step of calculating said normalized NRE by dividing by an aggregate traffic load of all links selected in step (e).

13. A method as claimed in claim 11 wherein step (c) further comprises the step of calculating said LUP by dividing by said aggregate traffic load.

14. A communication system that routes data packets over routes resulting in a substantially uniform usage of communication links, said routes comprising a list of said communication links to send a data packet between a source node and a destination node, said system comprising:

a plurality of nodes coupled by said communication links, each of said communication links having a link capacity;

multi-channel transceivers associated with each node for sending and receiving data packets over said communication links using said routes; and a control facility coupled to said nodes for providing routing tables to each of said nodes, wherein said routing tables are generated by a computer that: finds routes between said source node and said destination node;

calculates a link usage probability (LUP) for each communication link associated with each of said routes, wherein said LUP is proportional to a number of times an associated communication link is included on one of said routes and inversely proportional to said link capacity of said associated communication link;

calculates a normalized network routing entropy (NRE) for each of said routes using said LUPs associated with each communication link of said routes, said normalized NRE being normalized by an aggregate traffic load on all of said communication links;

selects a final route from said routes, said final route having a largest of said normalized NREs; and includes said final route in said routing tables.

* * * * *